US007738616B2

(12) United States Patent
Markman

(10) Patent No.: US 7,738,616 B2
(45) Date of Patent: Jun. 15, 2010

(54) PHASE TRACKING SYSTEM

(75) Inventor: Ivonete Markman, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1048 days.

(21) Appl. No.: 10/474,909

(22) PCT Filed: Apr. 16, 2002

(86) PCT No.: PCT/US02/11792

§ 371 (c)(1), (2), (4) Date: Oct. 15, 2003

(87) PCT Pub. No.: WO02/084967

PCT Pub. Date: Oct. 24, 2002

(65) Prior Publication Data

US 2004/0114701 A1 Jun. 17, 2004

Related U.S. Application Data

(60) Provisional application No. 60/284,268, filed on Apr. 16, 2001.

(51) Int. Cl.
*H04L 7/00* (2006.01)

(52) U.S. Cl. ........................ 375/371; 329/307; 329/357; 329/360; 330/107; 332/127; 332/170; 342/103; 375/215; 375/294; 375/301; 375/326; 375/327; 375/376; 388/911; 455/47; 455/180.3; 455/204; 455/260

(58) Field of Classification Search ................. 375/232, 375/240, 321, 324, 326, 332, 346, 371, 376; 370/491; 338/18

See application file for complete search history.

(56) References Cited

U.S. PATENT DOCUMENTS

| | | | | |
|---|---|---|---|---|
| 3,566,036 | A * | 2/1971 | Roche et al. | 370/491 |
| 3,781,720 | A * | 12/1973 | Mueller | 333/18 |
| 4,281,412 | A * | 7/1981 | Wissel et al. | 375/332 |

(Continued)

FOREIGN PATENT DOCUMENTS

EP 0740444 A1 10/1996

(Continued)

OTHER PUBLICATIONS

Zhang et al.; Implementation Scheme of VSB Modulation; Dec. 2-4, 1997; IEEE International Symposium on Consumer Electronics; pp. 67-70.*

Search Report.

*Primary Examiner*—David C Payne
*Assistant Examiner*—Adolf DSouza
(74) *Attorney, Agent, or Firm*—Robert D. Shedd; Paul P. Kiel; Brian J. Dorini

(57) ABSTRACT

A phase tracking system includes a source of an input signal representing a received symbol. A phase rotator has a first input terminal which is responsive to the input signal, a second input terminal which is responsive to a phase correction signal, and an output terminal which produces a phase adjusted output signal. A decision element generates an ideal signal representing the received symbol in response to the phase adjusted output signal. A phase adjuster, which has full phase wrap-around capability, generates the phase correction signal in response to the phase difference between the phase adjusted output signal and the ideal signal.

24 Claims, 1 Drawing Sheet

System

U.S. PATENT DOCUMENTS

| | | | | |
|---|---|---|---|---|
| 4,862,485 | A * | 8/1989 | Guinea et al. | 375/376 |
| 5,719,907 | A * | 2/1998 | Kaku et al. | 375/371 |
| 5,757,861 | A | 5/1998 | Lim | 375/321 |
| 6,016,080 | A * | 1/2000 | Zuta et al. | 331/25 |
| 6,115,431 | A | 9/2000 | Lee | 375/324 |
| 6,411,658 | B1 | 6/2002 | Sasaki | |
| 6,473,470 | B1 * | 10/2002 | Matui | 375/340 |

FOREIGN PATENT DOCUMENTS

| | | |
|---|---|---|
| JP | 7023072 | 1/1995 |
| JP | 11331293 | 5/1998 |
| JP | 2000041074 | 2/2000 |
| JP | 2001086175 | 3/2001 |
| KR | 1998-058152 | 9/1998 |

* cited by examiner

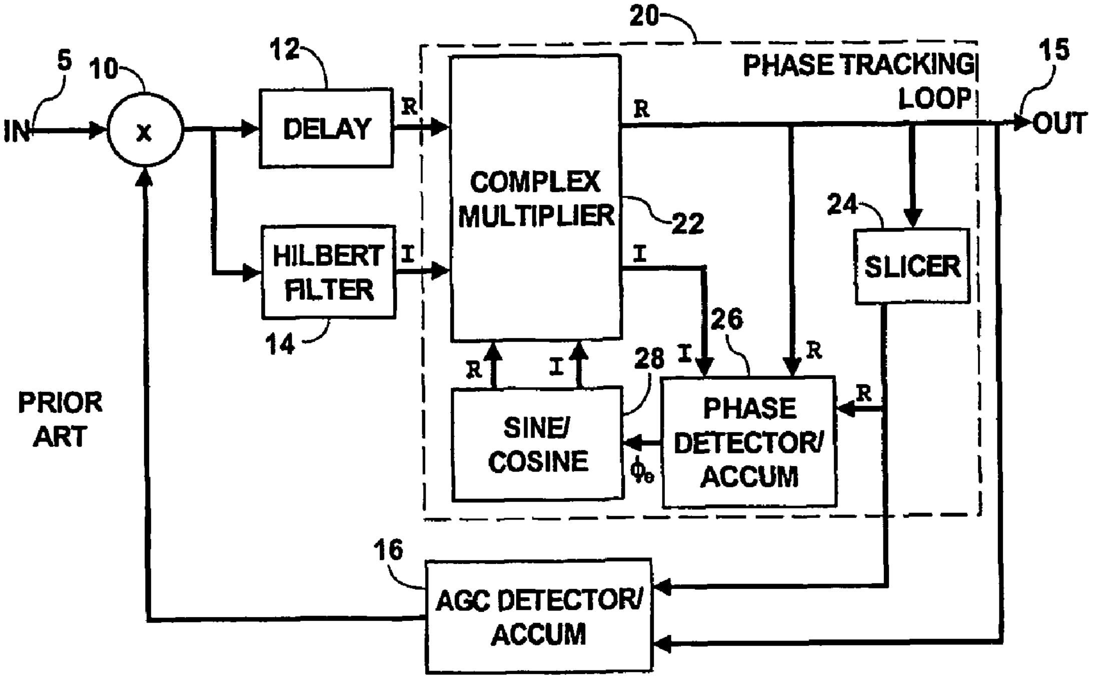
Fig. 1 – Prior art
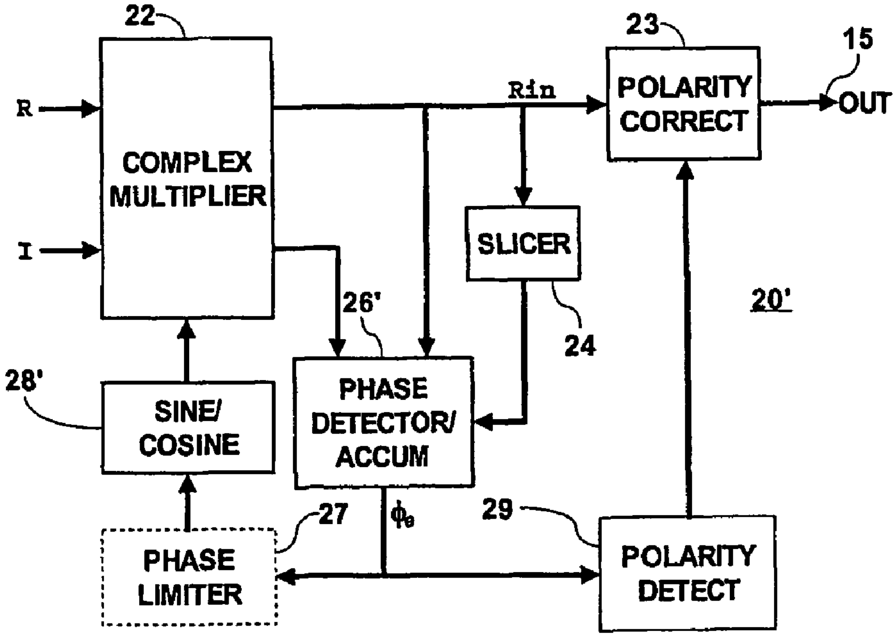
Fig. 2 - System

PHASE TRACKING SYSTEM

This application claims the benefit under 35 U.S.C. § 365 of International Application PCT/US02/11792 filed Apr. 16, 2002, which claims the benefit of U.S. Provisional Application No. 60/284,268 filed Apr. 16, 2001.

FIELD OF THE INVENTION

The present invention relates to phase tracking systems for use in digital communications receivers.

BACKGROUND OF THE INVENTION

The High definition television (HDTV) standard adopted by the Advanced Television Systems Committee (ATSC) in the U.S. is described in the "ATSC Digital Television Standard", Document A/53 published on Sep. 16, 1995. This document sets forth all the requirements regarding HDTV signal characteristics. In particular, the ATSC-HDTV signals require a suppressed carrier vestigial sideband modulation format, which is a well-known amplitude modulation method. In addition, a small in-phase pilot at the suppressed carrier frequency is added to the signal, being 11.3 dB below the average signal power.

A typical ATSC-VSB receiver demodulating scheme is disclosed in U.S. Pat. No. 6,233,295 entitled SEGMENT SYNC RECOVERY NETWORK FOR AN HDTV RECEIVER issued on May 15, 2001 to Wang. The disclosed demodulator includes an analog to digital (A/D) converter sampling at 21.52 MHz, a carrier tracking loop (CTL) operating at the 21.52 MHz sampling rate, followed by a symbol timing loop (STL) operating at the 10.76 MHz symbol rate, followed by a sync detector, equalizer and phase tracker (i.e., phase tracking loop), all working at the symbol rate of 10.76 MHz.

The A/D converter samples the analog signal at the sampling frequency, converting it into a sequence of digital samples with a specified number of bits per sample.

Carrier tracking, which is performed by the CTL, addresses the problem of frequency offset between the transmitter and receiver oscillators either intrinsic to their design or due to drifts, causing a drift of the sinusoidal carrier signal. The offset will cause the received signal constellation to rotate and forbid signal recovery. This "spinning" effect must be removed before accurate symbol decisions can be made. The purpose of the carrier tracking loop (CTL) is to remove this frequency offset and demodulate the signal down to baseband (from the original IF or near baseband frequency), so that the received signal can be properly processed directly at baseband. In the case of the VSB transmitted signal, by frequency shifting the signal down to baseband the full signal spectrum can be recovered from the RF spectrum, since only a portion of the original spectrum is actually transmitted.

Timing recovery, which is performed by the STL, is the process by which the receiver clock (timebase) is synchronized to the transmitter clock by decoding the timing signal which is embedded in the transmitted VSB signal. The two quantities which the receiver must determine in order to achieve symbol synchronization are the sampling frequency and the sampling phase. The sampling frequency is typically specified but oscillator drift will introduce deviations from the stated symbol rate. Sampling phase involves determining the correct time within a symbol period during which to take a data sample. The accuracy of the recovered timing signal is substantially equivalent to the accuracy of the transmitted VSB timing signal.

The sync detector detects the field and segment sync information embedded in the data stream by correlation and provides this information to other receiver blocks for synchronization purposes.

Equalization is a signal processing technique that attempts to correct for linear distortions in the received signal, which appear in the form of ISI, mainly caused by channel impairments (e.g., multipath propagation in the terrestrial broadcast channel) or by filtering in the receiver or transmitter.

Because the CTL is relatively narrow band, it cannot track high frequency phase noise (jitter) present in the carrier. This phase jitter manifests itself as a rotation of the symbol constellation in the complex plane. For this reason, a separate phase tracking loop (PTL), operating on the channel equalized baseband signal, is provided in the receiver to derotate the signal constellation so that symbol decisions will be accurate. Such PTLs are decision directed. That is, they calculate the phase difference between the phase of each received constellation point and the phase of the ideal constellation point corresponding to the symbol decided to be the most likely symbol to have been transmitted. This phase difference is then used to control the derotation of the baseband signal, all in a known manner. Because the system is already frequency locked to the carrier by the CTL, the PTL bandwidth is maximized for phase tracking by using a first order loop.

FIG. 1 is a block diagram of such a prior art phase tracking loop for use in an ATSC-HDTV television broadcast communications system. In FIG. 1, the received symbols are represented by a multilevel signal modulated as a VSB signal. More specifically, such a signal can be a suppressed-carrier 8-VSB, 15-VSB or 16-VSB modulated signal.

In FIG. 1, an input terminal 5 is coupled to a receiver front end (not shown) producing an equalized baseband signal representing successive transmitted symbols. The receiver front end may include, for example, an RF tuner, an IF amplifier, an analog-to-digital converter, a digital carrier recovery circuit, a symbol clock recovery circuit, a DC compensation circuit, a field and segment synchronization signal detector, an NTSC co-channel interference rejection circuit, and an adaptive channel equalizer, all of known design and most of which have been described above.

The input terminal 5 is coupled to a first input terminal of a multiplier 10. An output terminal of the multiplier 10 is coupled to respective input terminals of a delay circuit 12 and a Hilbert filter 14. An output terminal of the delay circuit 10 is coupled to the real input terminal R of the first complex input terminal of a complex multiplier 22. An output terminal of the Hilbert filter 14 is coupled to an imaginary input terminal I of the first complex input terminal of the complex multiplier 22. (The real and imaginary components of a signal are sometimes termed in-phase, and 'quadrature' components, respectively, referring to their correspondence to components in some complex modulation schemes.) A real output terminal R of the complex output terminal of the complex multiplier 22 is coupled to an output terminal 15. The output terminal 15 generates the real portion of a phase-corrected received signal. The output terminal 15 may be coupled to a receiver back end (not shown). The receiver back end may include, for example, a trellis decoder, a Reed-Solomon decoder, a descrambler, and video, audio and auxiliary signal processors, all of known design. This receiver back end operates to generate an image represented by the transmitted HDTV video signal, and sound represented by the transmitted audio signal, all in a known manner.

The real output terminal R of the complex multiplier 22 is also coupled to an input terminal of a slicer 24 and a real first input terminal R of a phase detector/accumulator 26. An imaginary output terminal I of the complex output terminal of the complex multiplier 22 is coupled to an imaginary first input terminal I of the phase detector/accumulator 26. An output terminal of the slicer 24 is coupled to a real second input terminal R of the phase detector 26. At each symbol time, the slicer selects, from a programmed look up table, a data symbol corresponding to the point in the symbol constellation that is closest to the input symbol sample as its decision. That is, the slicer selects as its decision the symbol in its alphabet which is closest in Euclidean distance to the input symbol sample. More specifically, the slicer expects an input signal at predetermined signal points along the real axis corresponding to the transmitted symbols.

An output terminal of the phase detector/accumulator 26 produces a signal $\phi_E$, representing the estimated phase error between the phase of a selected ideal signal and that of the corresponding received phase adjusted signal, as described above, and is coupled to an input terminal of a sine/cosine generator 28. Respective real R and imaginary I output terminals of the sine/cosine generator 28 are coupled to corresponding input terminals of a second complex input terminal of the complex multiplier 22. The combination of the complex multiplier 22, slicer 24, phase detector and accumulator 26 and sine/cosine generator 28 form a phase tracking loop 20.

In addition, phase tracking loops may have a parallel automatic gain control (AGC) loop, which corrects the signal for gain, to ensure that after the phase correction, the signal levels correspond to the predetermined slicer levels. The real output terminal of the complex multiplier 22 is also coupled to a first input terminal of an AGC detector and accumulator 16. The output terminal of the slicer 24 is coupled to a second input terminal of the AGC detector and accumulator 16. An output terminal of the AGC detector and accumulator 16 is coupled to a second input terminal of the multiplier 10, which performs the gain correction.

In operation, the VSB signal at the input terminal 5 has only a real component. However, in order to properly control the phase of the input signal IN, it must be rotated in the complex plane. The Hilbert filter 14 estimates an imaginary component I which corresponds to the real component R of the input signal IN. The delay circuit 12 compensates for the delay introduced by the Hilbert filter 14.

The complex input signal, represented by the real (R) and estimated imaginary (I) components, is derotated by the action of the complex multiplier 22. The real (R) component of the phase adjusted (derotated) signal, from the real output terminal of the complex multiplier 22, is supplied to the output terminal 15.

The slicer 24 compares the value of the real (R) component of the derotated signal to the ideal values of the real component for all of the possible symbols. The slicer 24 selects as the received symbol the symbol having an ideal real value closest to the real value of the derotated signal. The slicer 24 produces at its output terminal a signal having the value of the ideal real component of the selected symbol.

The phase detector and accumulator 26 generates a phase error signal $\phi_E$ by first estimating the phase angle between the ideal symbol from the slicer 24 and the corresponding output signal from the complex multiplier 22 in the complex plane. This phase difference is accumulated and the accumulation used as the phase error $\phi_E$. The accumulator is also referred to as a numerically controlled oscillator (NCO) and used to accumulate the phase-error. As each phase difference is calculated, it is added to the previously calculated accumulation within the NCO and the total used as the phase error $\phi_E$.

Complex real (R) and imaginary (I) components representing a phase correction angle for this phase error signal $\phi_E$ are generated in the sine/cosine generator 28. The amount of rotation of the input signal IN induced by the complex multiplier 22 is controlled by the values of these real (R) and imaginary (I) signals. The combination of the phase detector and accumulator 26 and sine/cosine generator 28 operate as a phase adjusting element. The complex multiplier 22 rotates the input signal IN by the compensating angle to produce the derotated output signal OUT.

Simultaneously, The AGC detector and accumulator 16 computes the amplitude difference between the actual derotated real component from the complex multiplier 22 and the ideal real component from the slicer 24. This difference represents the amount of error in the amplitude of the output signal OUT. This difference is accumulated and the accumulation used to control the multiplier 10 to adjust the gain of the input signal IN toward the desired level.

By providing fine control of the amplitude and phase of the input signal IN in this manner, the phase of the output signal OUT may be properly aligned with the transmitter carrier phase and the symbols may be detected in a more accurate manner.

One problem with this prior art system is that its design assumed that the phase had been adjusted relatively closely by the CTL. Thus, the sine/cosine generator 28 includes only values for adjusting the phase of the output signal OUT within a predetermined phase distance from zero. In one embodiment of such a prior art system, the sine/cosine generator 28 includes look-up tables which provide values for phase errors of only ±30°. Consequently, the maximum value from the NCO in the phase detector and accumulator 26 is adjusted to correspond to +30° while the minimum value from the NCO is adjusted to correspond to −30°. That is, the NCO in the phase detector and accumulator 26 is not allowed to have a wrap-around phase capability (±180°). Should the NCO wrap around from its maximum value to its minimum value, the correction phase skips from +30° to −30°. This represents a large phase discontinuity (around 300°), which, unless forbidden by design, is then detected as a large phase error and added to the accumulator (NCO). As a result, impulse noise and transient conditions in preceding circuit elements, such as the carrier tracking loop, symbol timing loop and equalizer, may cause substantial phase errors to accumulate in the phase detector and accumulator 26. This, in turn, may cause inaccurate and undesirable upper and/or lower limited phase outputs at the ±30° points or, if not forbidden, an NCO wrap-around, that is, a large phase discontinuity. In both cases, recovery of the phase tracker from these situations is almost impossible if the NCO is not reset to 0. A phase tracking system which provides full phase wrap-around capabilities, thus avoiding the problems related to impulse noise and transient conditions, permitting an easier self-recovery, is desirable.

BRIEF SUMMARY OF THE INVENTION

In accordance with principles of the present invention a phase tracking system includes a source of an input signal representing a received symbol. A phase rotator has a first input terminal which is responsive to the input signal, a second input terminal which is responsive to a phase correction signal, and an output terminal which produces a phase adjusted output signal. A decision element generates an ideal signal representing the received symbol in response to the phase adjusted output signal. A phase adjuster, which has full phase wrap-around capability, generates the phase correction signal in response to the phase difference between the phase adjusted output signal and the ideal signal.

BRIEF DESCRIPTION OF THE DRAWING

In the drawing:

FIG. 1 is a block diagram of a prior art phase tracking loop; and

FIG. 2 is a block diagram of a phase tracking loop according to principles of the present invention.

DETAILED DESCRIPTION OF THE INVENTION

FIG. 2 is a block diagram of a phase tracking loop 20' according to principles of the present invention. In FIG. 2, those elements which are the same as those illustrated in FIG. 1 are designated by the same reference numbers and are not discussed in detail below. In FIG. 2, the real output terminal R of the complex multiplier 22 is coupled to an input terminal Rin of a polarity corrector 23. An output terminal of the polarity corrector 23 is coupled to the output terminal 15. The output terminal of the phase detector and accumulator 26' is coupled to the input terminal of the sine/cosine generator 28' and an input terminal of a polarity detector 29. An output terminal of the polarity detector 29 is coupled to a control input terminal of the polarity corrector 23.

In operation, the sine/cosine generator 28' includes a full ±180° look-up table. This permits the phase detector and accumulator 26' to have a full wrap-around phase capability. That is, the maximum value of the NCO in the phase detector and accumulator 26' is adjusted to produce a 180° phase output from the sine/cosine generator 28' and the minimum value of the NCO is adjusted to produce a −180° phase output from the sine/cosine generator 28'. Thus, when the NCO wraps-around from maximum to minimum, the phase changes from +180° to −180°, which produces no phase discontinuity. This in turn eliminates accumulation of large phase errors in the NCO under the conditions described above.

The phase detector and accumulator 26' is also designed to be 180° phase rotation invariant. By providing phase rotation invariant phase detection, the phase detector 26' of FIG. 2 need only calculate the phase difference between the phase of the output signal from the complex multiplier 22 and the real axis, either 0° or 180°. More concisely, the phase detector and accumulator 26' can lock to either 0° or 180°. The normal behavior of the phase tracker assumes that the phase is going to vary around the 0° phase, since the CTL takes care of removing the 180° phase ambiguity generally associated with the VSB modulation, by observing the dc offset created by the carrier pilot when the signal is frequency shifted to baseband. However, if impulse noise is enough to drive the NCO to phases beyond 90°, the phase tracker can recover by locking to the 180° phase, as long as its output is corrected for the 180° phase rotation that the phase tracker is now imposing on the signal. This permits the phase tracker to self-recover much more easily from temporary loss of lock.

When the phase detector and accumulator 26' is locked to the 0° real axis, the operation of the system illustrated in FIG. 2 is the same at the system illustrated in FIG. 1. However, when the phase detector and accumulator 26' is locked to the 180° real axis, the complex multiplier 22 will produce real (R) output signals which are the negative of the actual desired output signals. In this case, the output signals from the complex multiplier 22 must be negated. The polarity detector 29 analyzes the phase error signal $\phi_E$ to determine whether the phase detector and accumulator 26' is locked to the 0° axis or the 180° axis in a manner to be described in more detail below. The polarity detector 29, in turn, provides a control signal to the polarity corrector 23 having a first state when it detects that the phase detector and accumulator 26' is locked to the 0° axis and a second state when it detects that the phase detector and accumulator 26' is locked to the 180° axis. The polarity corrector 23 responds to this control signal to negate its input samples when the phase detector and accumulator 26' is locked to the 180° axis and to pass the input samples to its output unchanged when the phase detector and accumulator 26' is locked to the 0° axis.

Referring to Table 1 (below), the polarity detector 29 analyzes the phase error signal $\phi_E$. If the phase error signal is anywhere in the right half of the complex plane (i.e. $-90°<\phi_E\leqq 90°$), then it is assumed that the phase detector and accumulator 26' is locked to the 0° axis. In this case, a polarity control signal having the value '0' is produced at the output terminal of the polarity detector 29. If the phase error signal is anywhere in the left half of the complex plane (i.e. $90°<\phi_E\leqq 270°$), then it is assumed that the phase detector and accumulator 26' is locked to the 180° axis. In this case, the polarity control signal has the value '1'.

TABLE 1

| Phase | Polarity control signal |
|---|---|
| $-90° < \phi_E \leqq 90°$ | 0 |
| $90° < \phi_E \leqq 270°$ | 1 |

Referring to Table 2 (below), the polarity corrector 23 responds to the polarity control signal by negating the signal at its input terminal Rin when the polarity control signal is '1' (left half plane) and passing the signal at its input terminal unchanged when the polarity control signal is '0' (right half plane).

TABLE 2

| Polarity control signal | OUT |
|---|---|
| 0 | Rin |
| 1 | −Rin |

While the combination of the phase detector and accumulator 26' and the sine/cosine generator 28' provides full phase wrap-around capability and 180° phase rotation invariant locking, because VSB receivers are very sensitive to small phase rotations, it may still be desirable to limit the phase error signal supplied to the sine/cosine generator 28', and thus the phase correction signal supplied to the complex multiplier 22, to within a range of phase angles from 0° or from 180°. This function may be provided by a phase limiter 27, coupled between the phase detector 26' and the sine/cosine generator 28', illustrated in phantom in FIG. 2. This phase limiter 27 operates by analyzing the phase error signal $\phi_E$ to determine the angle of the phase error signal $\phi_E$ from the closest real axis. If this angle is greater than a specified phase range value, termed $\alpha$ in the remainder of this application, then the limited phase error signal supplied to the sine/cosine generator 28' is controlled to be within a corresponding limit angle in a manner to be described below.

Referring to Table 3 (below), four phase limits are calculated based on the predetermined phase range value $\alpha$. Assuming first that the phase detector and accumulator 26' is locked to the positive real axis (0°), a first phase limit $\alpha_1$ is equal to $+\alpha$ and represents the end of the positive range from 0°. A second phase limit $\alpha_2$ is equal to $-\alpha$ and represents the end of the negative range from 0°. Assuming then that the phase detector and accumulator 26' is locked to the negative real axis (180°), a third phase limit $\alpha_3$ is equal to 180°−α and represents the end of the positive range from 180°. A fourth phase limit $\alpha_4$ is equal to −(180°−α) and represents the end of the negative range from 180°.

TABLE 3

| Phase limits | Function |
|---|---|
| $\alpha_1$ | +α |
| $\alpha_2$ | −α |
| $\alpha_3$ | 180° − α |
| $\alpha_4$ | −(180° − α) |

Referring to Table 4 (below), the phase error signal $\phi_E$ is then compared to these four phase limits $\alpha_1$, $\alpha_2$, $\alpha_3$, and $\alpha_4$. If the phase error signal $\phi_E$ lies within the predetermined phase range α of the real axis, where $0° \leqq \alpha \leqq 90°$, then the limited phase error signal supplied to the sine/cosine generator 28' is set equal to the phase error signal $\phi_E$. This is represented by the first two lines where $\phi_E$ is between $\alpha_1$ and $\alpha_2$ (line 1) and $\phi_E$ is between $\alpha_3$ and $\alpha_4$ (line 2). Conversely, if $\phi_E$ is not within the predetermined phase range α of the real axis, then the limited phase error signal is set to the appropriate one of the phase limit values $\alpha_1$, $\alpha_2$, $\alpha_3$, or $\alpha_4$. If the phase error signal $\phi_E$ is greater than the first phase limit value $\alpha_1$ and in the right hand side of the plane, then the limited phase error signal is set equal to $\alpha_1$ (line 3). If the phase error signal $\phi_E$ is less than the second phase limit value $\alpha_2$ and in the right hand side of the plane, then the limited phase error signal is set equal to $\alpha_2$ (line 4). If the phase error signal $\phi_E$ is less than the third phase limit value $\alpha_3$ and in the left hand side of the plane, then the limited phase error signal is set equal to $\alpha_3$ (line 5). If the phase error signal $\phi_E$ is greater than the fourth phase limit value $\alpha_4$ and in the left hand side of the plane, then the limited phase error signal is set equal to $\alpha_4$ (line 6).

TABLE 4

| Limited phase error | Phase error |
|---|---|
| $\phi_E$ | $\alpha_2 \leqq \phi_E \leqq \alpha_1$ |
| $\phi_E$ | $\alpha_3 \leqq \phi_E \leqq 180°$ or $-180° \leqq \phi_E \leqq \alpha_4$ |
| $\alpha_1$ | $\alpha_1 < \phi_E \leqq 90°$ |
| $\alpha_2$ | $-90° \leqq \phi_E < \alpha_2$ |
| $\alpha_3$ | $90° < \phi_E < \alpha_3$ |
| $\alpha_4$ | $\alpha_4 < \phi_E < -90°$ |

One skilled in the art will understand that the phase range value α may either be fixed or variable. If fixed, the phase range is set at design and/or at implementation time and the phase tracking loop will be implemented with an unchangeable predetermined phase range α. The predetermined phase range α may be set differently, however, from implementation to implementation. If the phase range value α is varied dynamically, a control signal (not shown) carrying the value a is coupled to a control input terminal (also not shown) of the phase limiter 27. In this case, the calculations illustrated in Table 3 and Table 4, above, are carried out using the value of the phase range signal α last received at the control input terminal.

One skilled in the art will also understand that the phase limiter 27 is optional, and may be omitted completely. In addition, one skilled in the art will understand that if the phase limiter 27 is included, it may be dynamically enabled and disabled. Referring to Table 5 (below), in this case, another control signal (not shown) carrying an enable/disable control signal is coupled to a corresponding control input terminal (also not shown) of the phase limiter 27. If such a signal is provided, the calculations illustrated in Table 4, above are modified to take into account the enable control signal. That is, if the phase limiter 27 is enabled (e.g. the enable signal has the value '1'), then the calculations illustrated in Table 4 are performed. This is illustrated in the first six rows of Table 5. Conversely, if the phase limiter is disabled (e.g. the enable signal has the value '0'), then the phase error signal $\phi_E$ is passed to the sine/cosine generator 28' unchanged and unlimited. This is illustrated in the seventh row of Table 5.

TABLE 5

| Enable | Phase correction | Phase error |
|---|---|---|
| 1 | $\phi_E$ | $\alpha_2 \leqq \phi_E \leqq \alpha_1$ |
| 1 | $\phi_E$ | $\alpha_3 \leqq \phi_E \leqq 180°$ or $-180° \leqq \phi_E \leqq \alpha_4$ |
| 1 | $\alpha_1$ | $\alpha_1 < \phi_E \leqq 90°$ |
| 1 | $\alpha_2$ | $-90° \leqq \phi_E < \alpha_2$ |
| 1 | $\alpha_3$ | $90° < \phi_E < \alpha_3$ |
| 1 | $\alpha_4$ | $\alpha_4 < \phi_E < -90°$ |
| 0 | $\phi_E$ | — |

By including a phase limiter 27, as described above, with a phase tracking loop including a phase detector and accumulator 26' and sine/cosine generator 28' which has a full phase wrap-around capability, a receiving system may limit the fine phase adjustments to small amounts, i.e. no more than α degrees at a time, while allowing large phase errors to accumulate in the accumulator NCO in the phase detector and accumulator 26'.

The present invention has been described above and illustrated in the Figure as being implemented as separate circuit elements. One skilled in the art will understand that all or any portion of the illustrated system may be implemented by a processor operating under the control of a control program. The present invention has also been described in terms of a terrestrial HDTV broadcast system using a multilevel VSB modulation scheme. One skilled in the art will understand that the phase tracking loop described above may be readily adapted for use with any one-dimensional modulation scheme. More generally, such a phase tracking loop may be included in any communications receiver which includes a digital demodulation system where the operations of carrier tracking and phase tracking are performed separately, especially in systems in which the carrier tracking loop is a narrow bandwidth loop and other demodulation functions, such as symbol timing recovery and equalization, precede the phase tracking loop.

The invention claimed is:

1. A phase tracking system, comprising:

a source of an input signal representing a received symbol;

a phase rotator, having a first input terminal responsive to the input signal, a second input terminal responsive to a phase correction signal, and an output terminal producing a phase adjusted output signal;

a decision element, responsive to the phase adjusted output signal, for generating an ideal signal representing the received symbol; and a phase adjuster, for generating the phase correction signal responsive to the phase difference between the ideal signal and the phase adjusted output signal, wherein the phase adjuster has full phase wrap-around capability and comprises a phase limiter for limiting the phase correction signal to within a specified range.

2. The system of claim 1 wherein the phase adjuster is 180° phase rotation invariant.

3. The system of claim 2 further comprising:

a polarity detector, responsive to the phase difference, for generating a control signal having a first state when the phase adjuster is locked to the positive real axis and a second state when the phase adjuster is locked to the negative real axis; and a polarity corrector, for generating a corrected phase adjusted output signal responsive to the phase adjusted output signal and the control signal.

4. The system of claim 3 further wherein the polarity corrector is configured to generate the corrected phase adjusted output signal by negating the phase adjusted output signal when the control signal is in the second state and passing the phase adjusted output signal unchanged when the control signal is in the first state.

5. The system of claim 1 wherein the phase rotator comprises a complex multiplier having a first complex input terminal responsive to the input signal, a second complex input terminal responsive to the phase correction signal and a complex output terminal producing the phase adjusted output signal.

6. The system of claim 5 wherein:

the input signal comprises only a real component;

the system further comprises a Hilbert filter, responsive to the real component of the input signal, for generating a signal representing an estimation of an imaginary component of the input signal; and the first complex input terminal of the complex multiplier comprises a real input terminal coupled to the input signal source and an imaginary input terminal coupled to the Hilbert filter.

7. The system of claim 5 wherein:

the complex multiplier produces the phase adjusted output signal as a complex signal having a real and an imaginary component;

the decision element generates an ideal signal having only a real component in response to the real component of the phase adjusted output signal; and the phase adjuster comprises:

a phase detector, coupled to the phase rotator and the decision element, for:

estimating the phase of the phase adjusted output signal from the real and imaginary components of the output signal from the complex multiplier;

estimating the phase of the idea signal from the real component of the ideal signal; and estimating the phase difference between the ideal signal and the phase of the phase adjusted output signal; and a phase corrector, for generating the phase correction signal responsive to the phase difference.

8. The system of claim 7 wherein the phase adjuster further comprises an accumulator for accumulating the phase difference.

9. The system of claim 7 wherein the phase corrector comprises a sine/cosine generator, having a full ±180° capability, responsive to the phase difference, for generating the complex phase correction signal.

10. The system of claim 9 wherein the phase adjuster further comprises an accumulator for accumulating the phase difference wherein the maximum value of the accumulator corresponds to +180° and the minimum value of the accumulator corresponds to −180°.

11. The system of claim 1 wherein the phase adjuster comprises:

a phase detector, coupled to the phase rotator and the decision element, for detecting the phase difference between the ideal signal and the phase adjusted output signal; and a phase corrector, for generating the phase correction signal responsive to the phase difference.

12. The system of claim 11 wherein the phase detector further comprises an accumulator for accumulating successive phase differences.

13. The system of claim 12 wherein the phase corrector comprises a sine/cosine generator having a full ±180° range for generating the phase correction signal in response to the accumulated phase differences; and the accumulator has a maximum value associated with the +180° entry in the sine/cosine generator and a minimum value associated with the −180° entry in the sine/cosine generator.

14. The system of claim 13 wherein the sine/cosine generator comprises a look-up table having a full ±180° range.

15. The system of claim 1 wherein said input signal is a high definition television VSB modulated signal in accordance with the ATSC standard.

16. The system of claim 1 wherein said input signal is modulated by a one-dimensional modulation technique.

17. The system of claim 1 wherein the phase limiter limits the phase correction signal to within one or more specified ranges around the following angles: 0 degrees and 180 degrees.

18. The system of claim 1, wherein the phase adjuster limits phase adjustments to within the specified range while accumulating phase error greater than the specified range.

19. A method comprising:

receiving an input signal representing a received symbol;

rotating the input signal based on a phase correction signal to produce a phase adjusted output signal;

generating, based on the phase adjusted output signal, an ideal signal representing the received symbol; and generating a phase correction signal based on a phase difference between the ideal signal and the phase adjusted output signal, wherein a phase adjuster is used to generate the phase correction signal and the phase adjuster has full phase wrap-around capability, and wherein generating the phase correction signal comprises limiting the phase correction signal to within a specified range.

20. The method of claim 19 further comprising:

generating a control signal having a first state when the phase adjuster is locked to the positive real axis and a second state when the phase adjuster is locked to the negative real axis; and generating a corrected phase adjusted output signal responsive to the phase adjusted output signal and the control signal.

21. The method of claim 20 wherein generating the corrected phase adjusted output signal comprises negating the phase adjusted output signal when the control signal is in the second state and passing the phase adjusted output signal unchanged when the control signal is in the first state.

22. The method of claim 19 wherein limiting the phase correction signal comprises limiting the phase correction signal to within one or more specified ranges around the following angles: 0 degrees and 180 degrees.

23. The method of claim 19 wherein generating the phase correction signal comprises:

estimating phase of the phase adjusted output signal from real and imaginary components of the phase adjusted output signal;

estimating phase of the ideal signal from a real component of the ideal signal;

estimating phase difference between the ideal signal and the phase of the phase adjusted output signal; and generating the phase correction signal responsive to the phase difference between the ideal signal and the phase of the phase adjusted output signal.

24. The method of claim 19, wherein the phase adjuster limits phase adjustments to within the specified range while accumulating phase errors greater than the specified range.

* * * * *